DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 5

T940,002

METHOD AND APPARATUS FOR PRODUCING CUSTOMIZED AND USER-ADDED PROGRAMMING INFORMATION

Donald J. Costa and Harry D. Entz, San Jose, George E. Espersen, Los Gatos, Edward A. Lane, San Jose, Ernest H. Mashburn, Boulder Creek, Jack B. Mumford, Saratoga, and Edward H. Nelson, San Jose, Calif., Frank John Fendt, Barrington, Ill., and Richard W. Wright, Marlton, N.J., assignors to International Business Machines Corporation, Armonk, N.Y.

Continuation of application Ser. No. 313,910, Dec. 11, 1972, which is a continuation of application Ser. No. 99,492, Dec. 18, 1970. This application Nov. 9, 1973, Ser. No. 414,550

Int. Cl. G06f 9/16

U.S. Cl. 444—1

19 Sheets Drawing. 50 Pages Specification

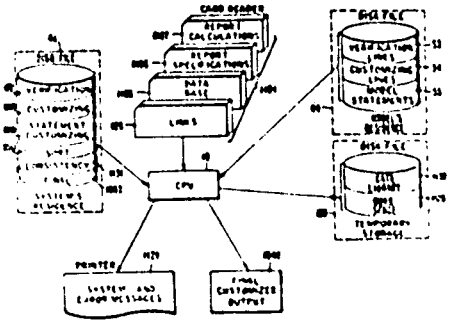

Method and apparatus for incorporating user-added data base, report specification, and calculation program information into programs for a computer that are customized in accordance with responses to a questionnaire. User-added program information is especially identified and supplied together with the responses to the questionnaire for verification. The responses are checked in accordance with verification instruction, none of which are directed to the especially identified program information. The verified responses are employed to select and modify customizing instructions which, in turn, delete, select, and modify program statements. The especially identified program information together with certain of the program statements are sorted into a sequential arrangement and are checked for consistency and for agreement with any prior stored information. The program information and selected program statements are then sorted into final output format and supplied as final output.

METHOD AND APPARATUS FOR PRODUCING CUSTOMIZED AND USER-ADDED PROGRAMMING INFORMATION
Original Filed Nov. 9, 1973
FIG. 1
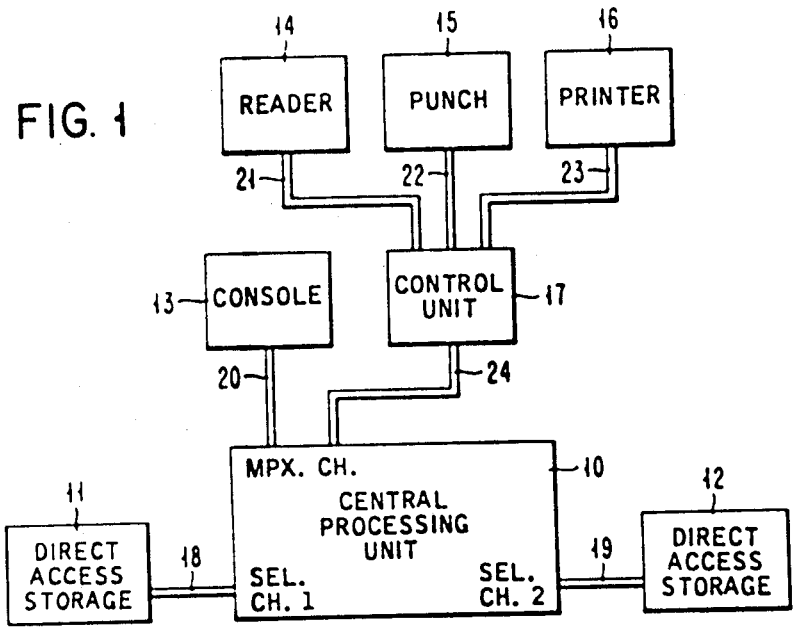
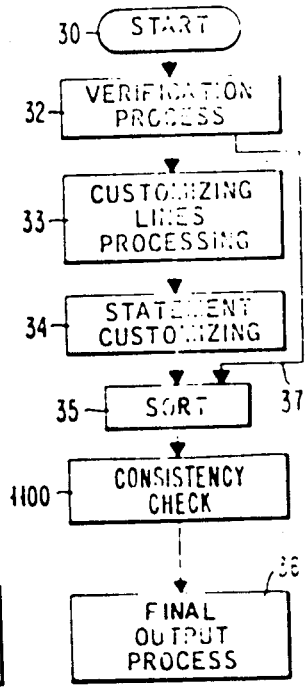
FIG. 2
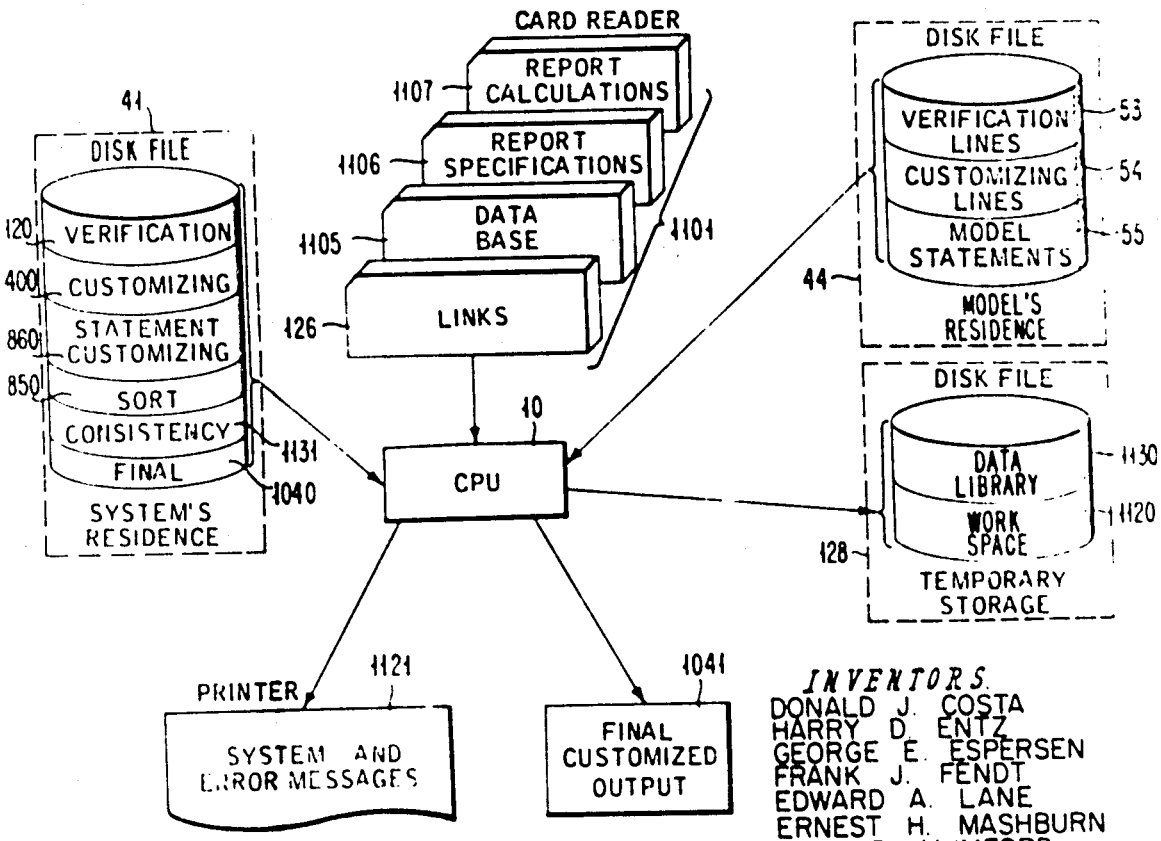
MODEL TRANSLATION SYSTEMS FLOW FIG. 3
INVENTORS
DONALD J. COSTA
HARRY D. ENTZ
GEORGE E. ESPERSEN
FRANK J. FENDT
EDWARD A. LANE
ERNEST H. MASHBURN
JACK B. MUMFORD
EDWARD H. NELSON
RICHARD W. WRIGHT
BY John H. Holcombe
ATTORNEY

Figure 4A:
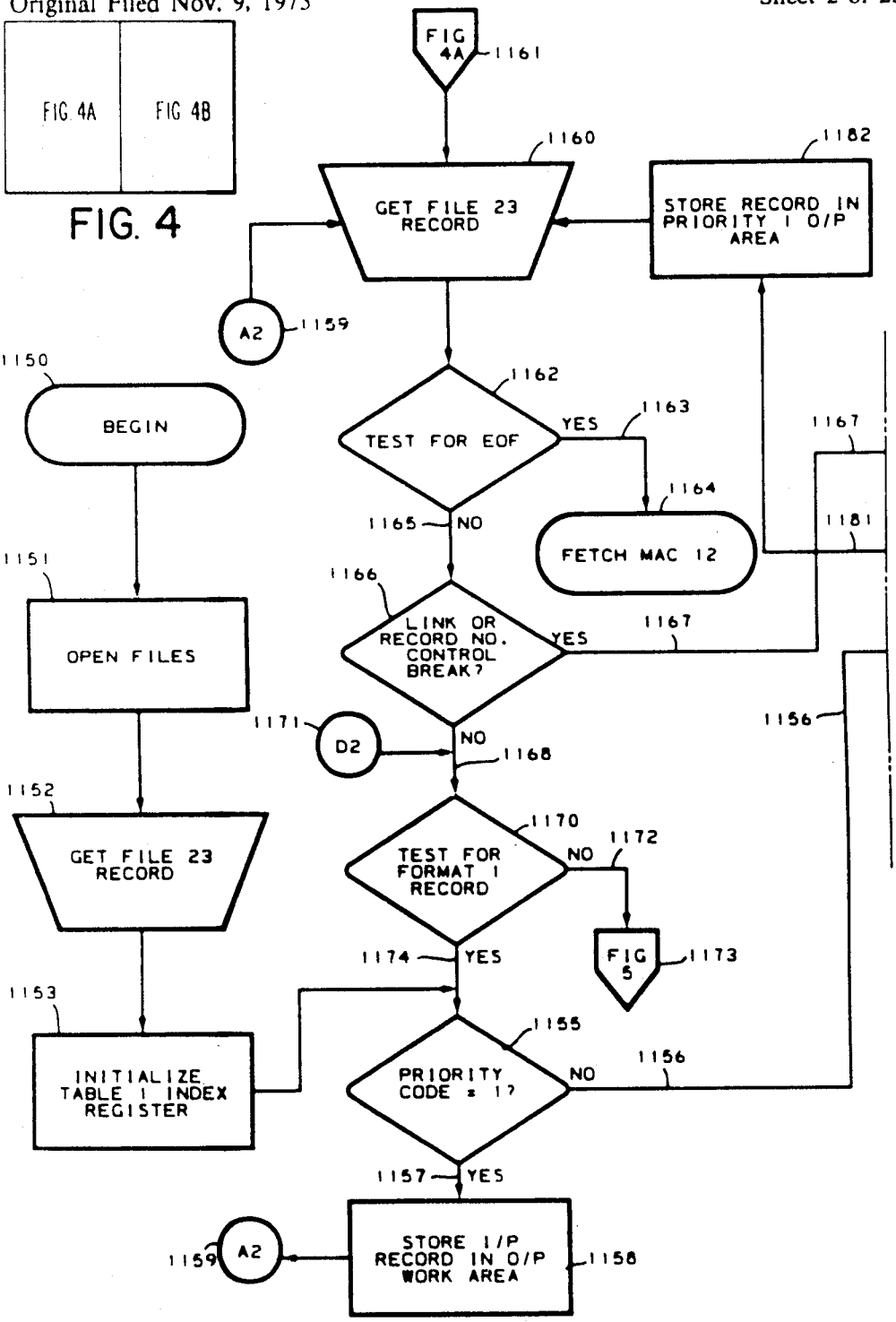
Figure 4B:
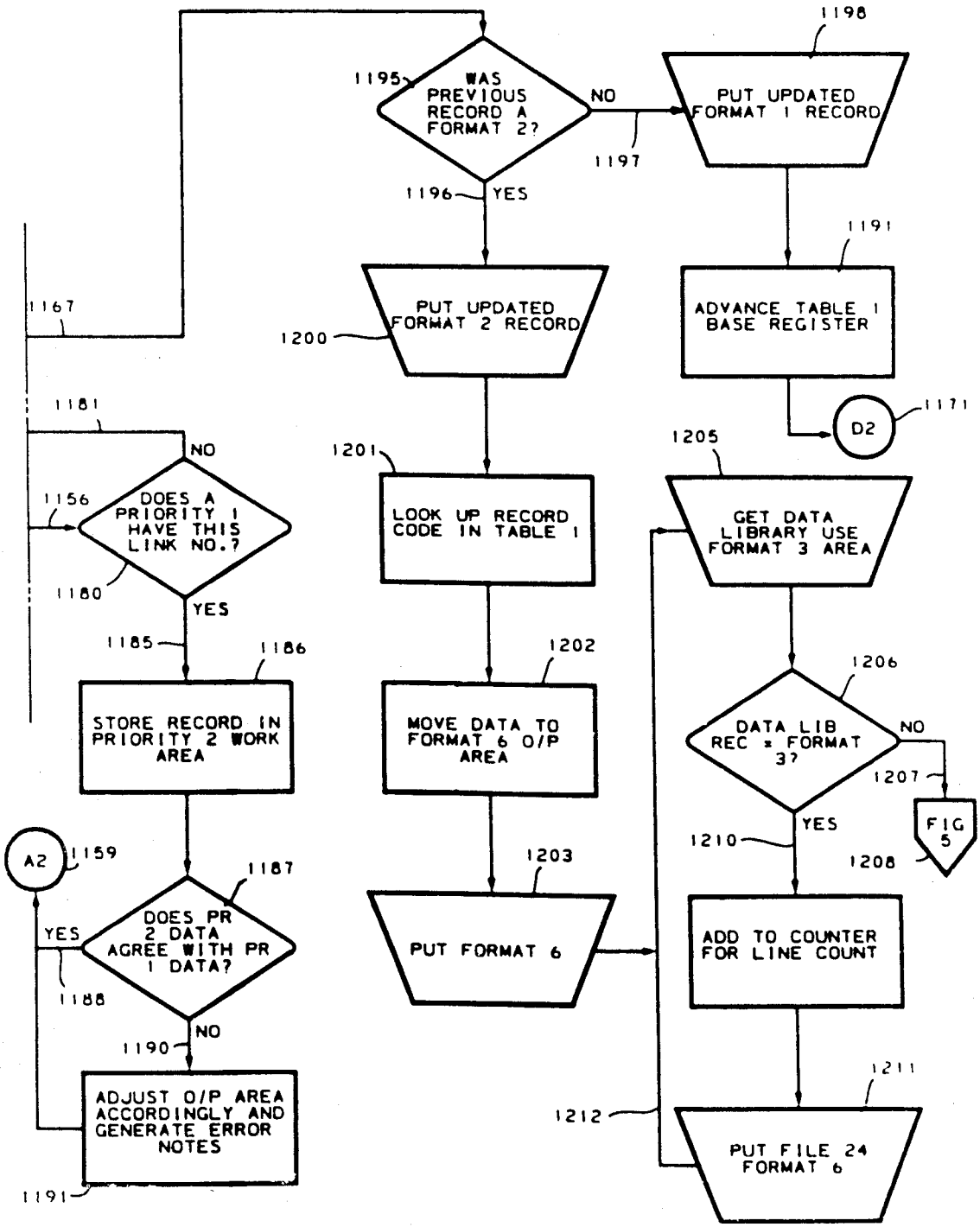
Figure 5:
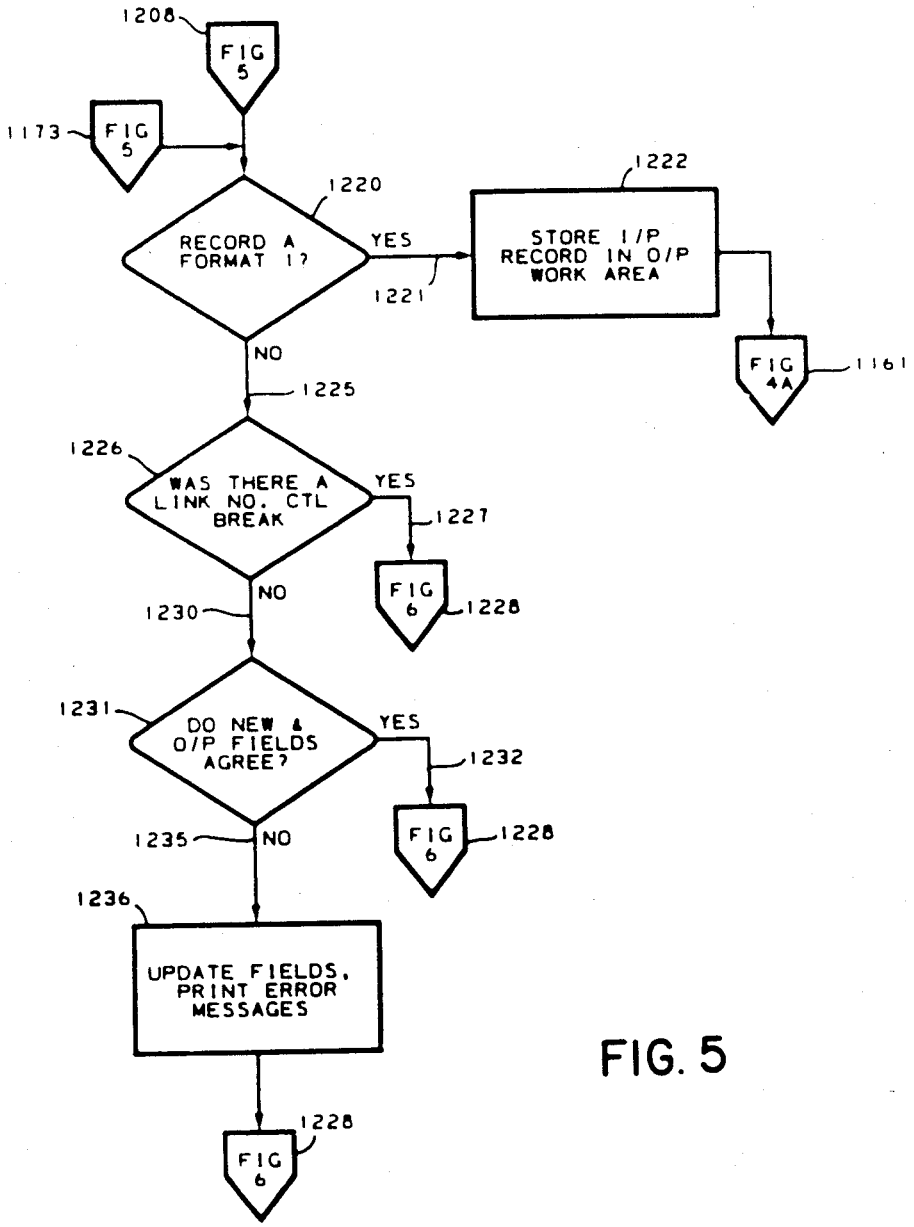
Figure 6:
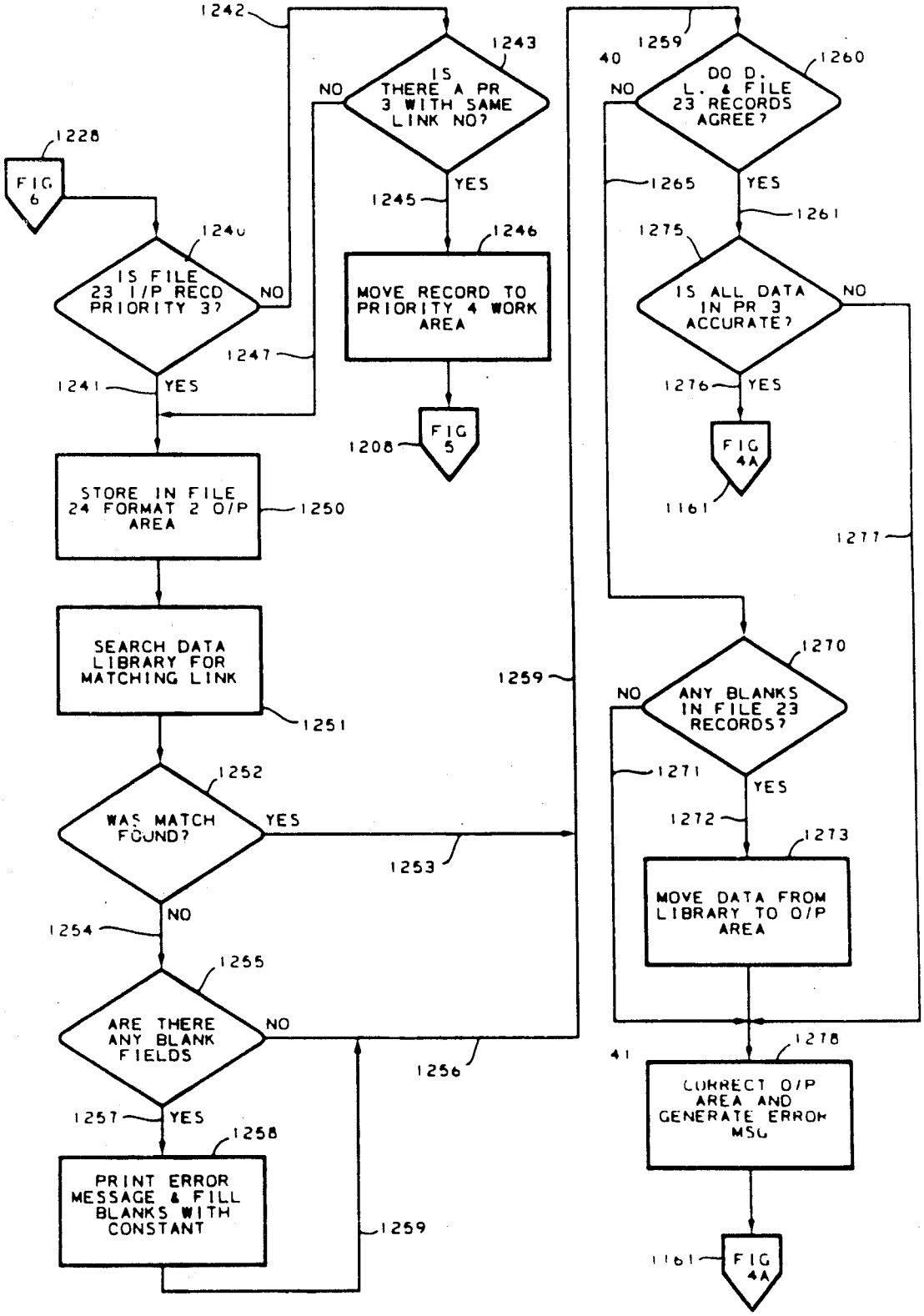
Figure 7:
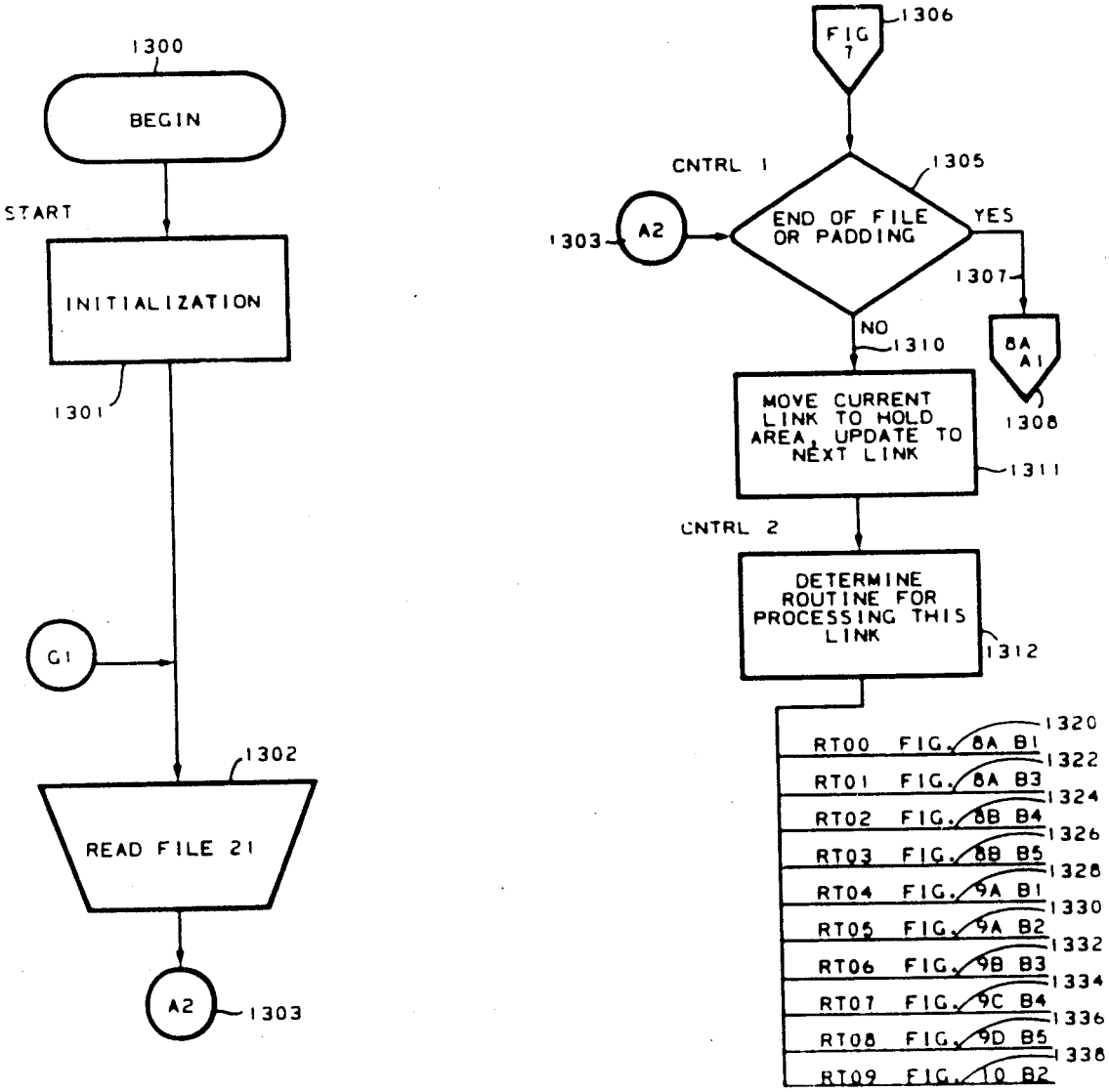
Figure 8A:
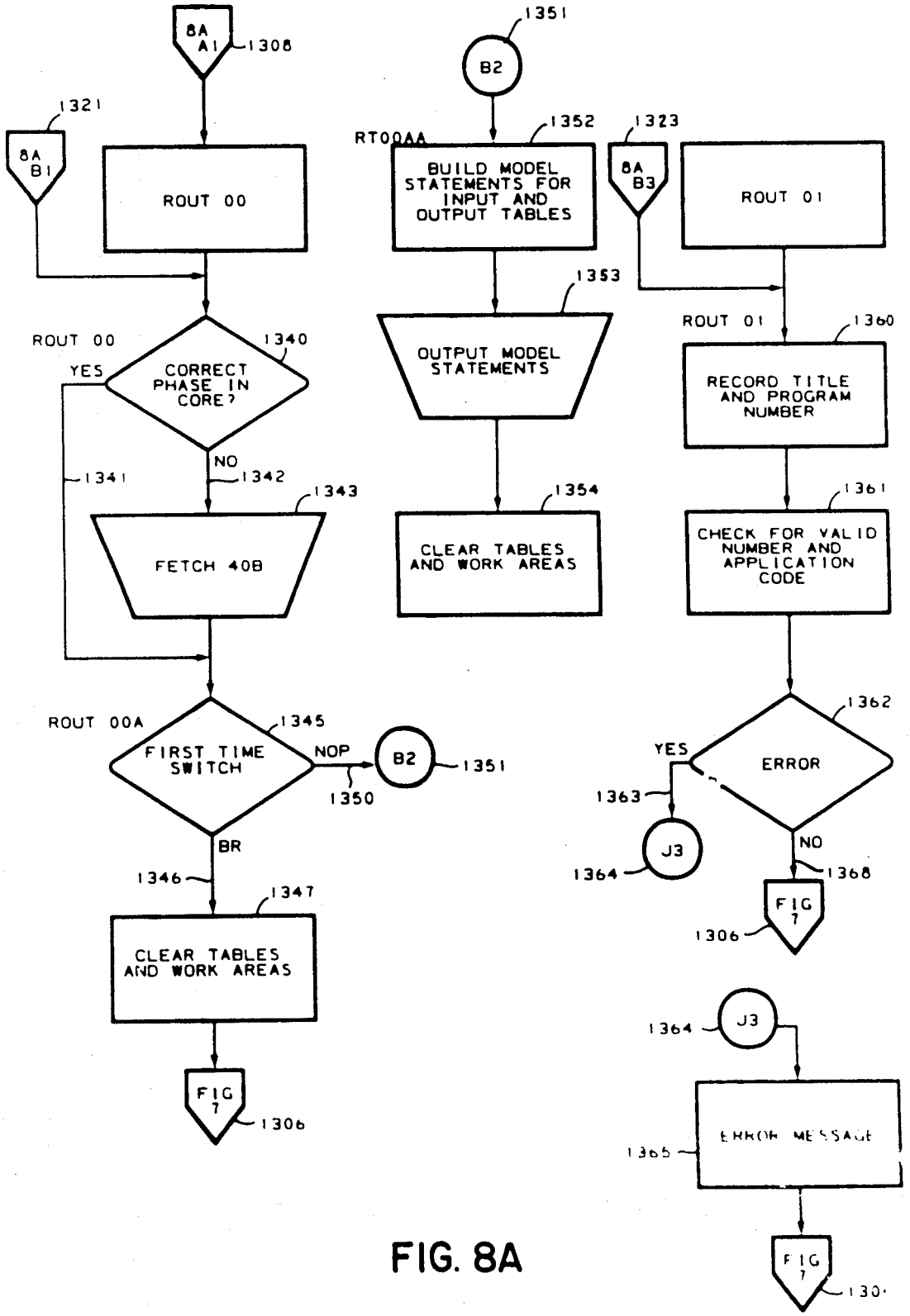
Figure 8B:
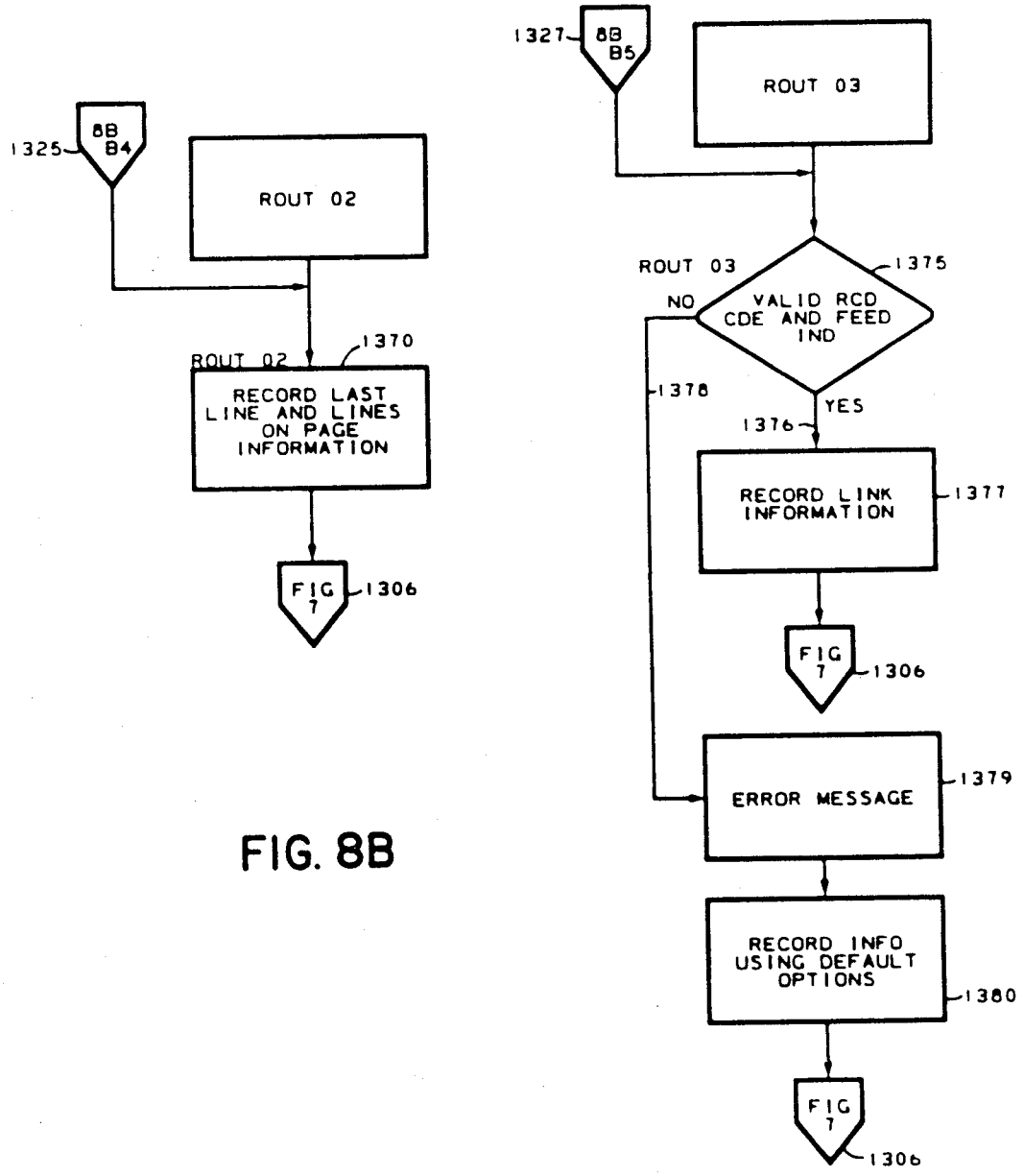
Figure 9A:
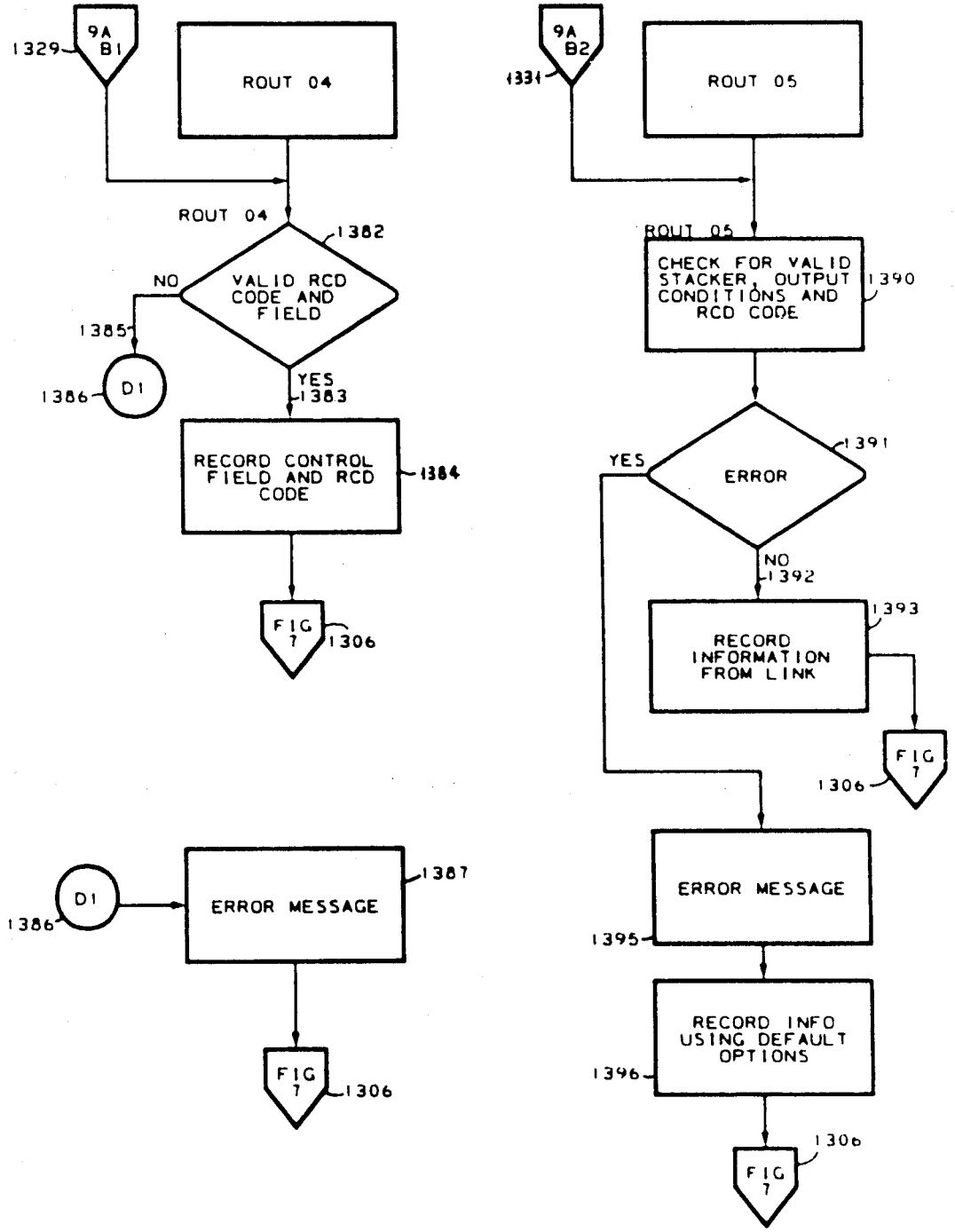
Figure 9B:
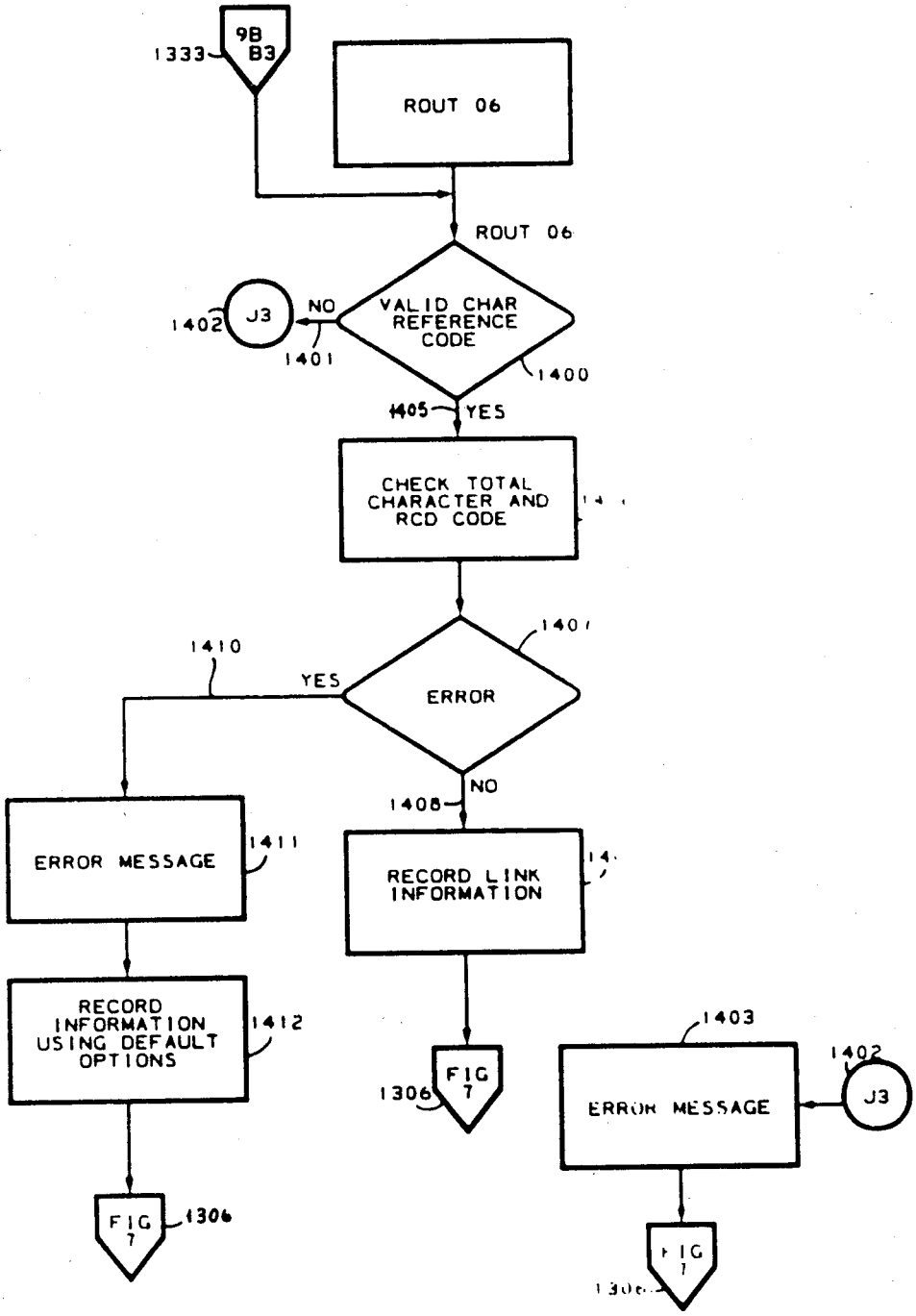
Figure 9C:
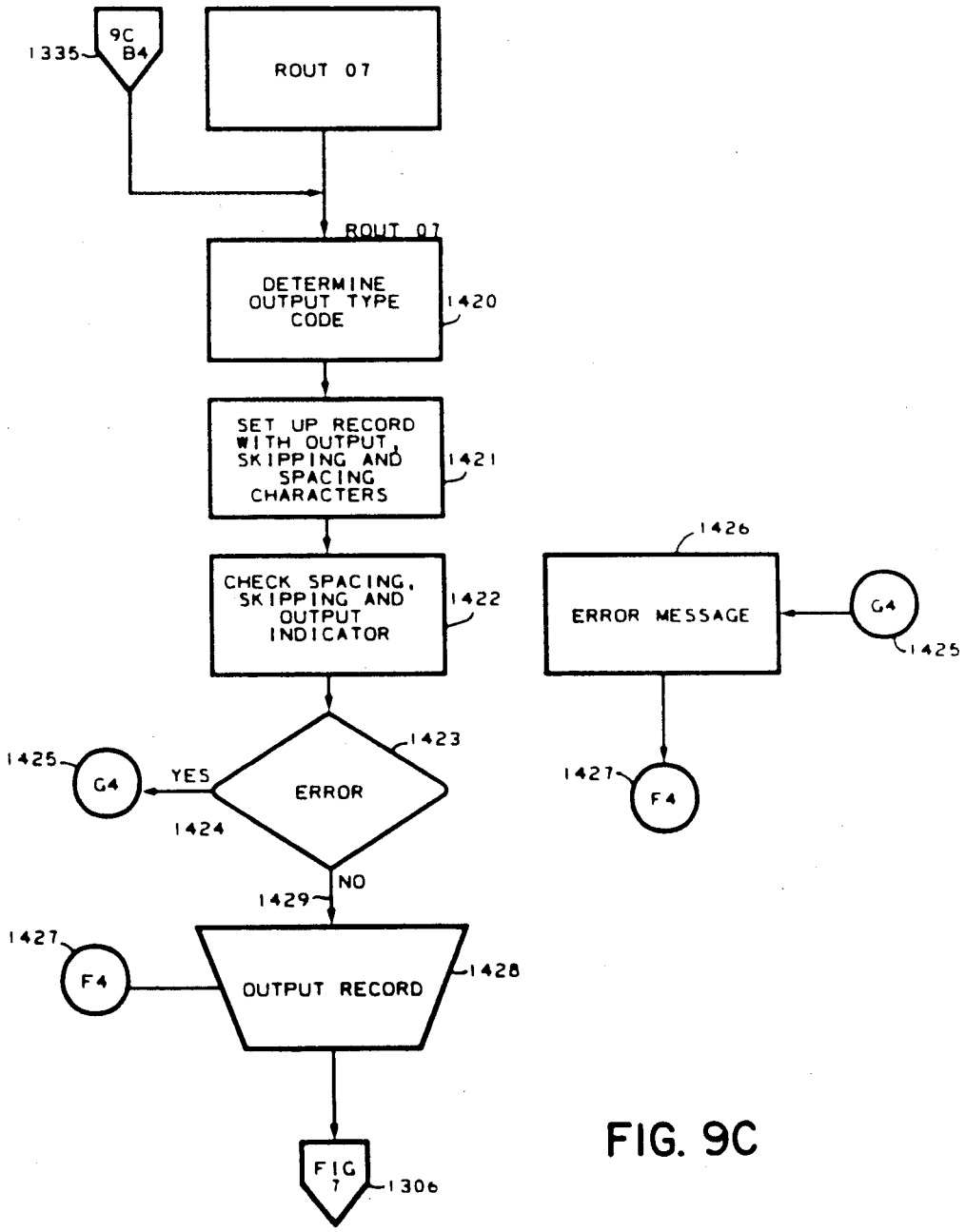
Figure 9D:
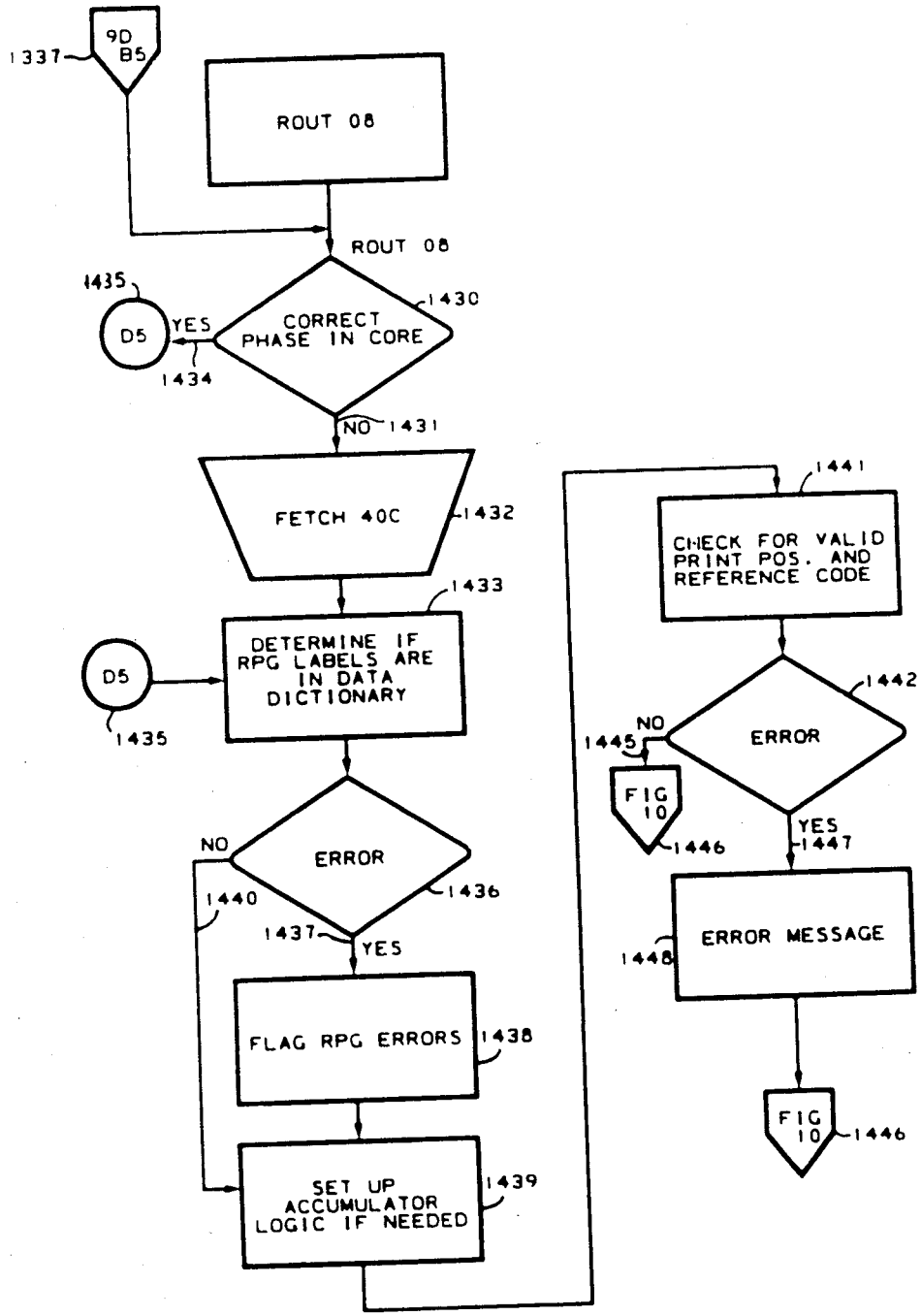
Figure 10:
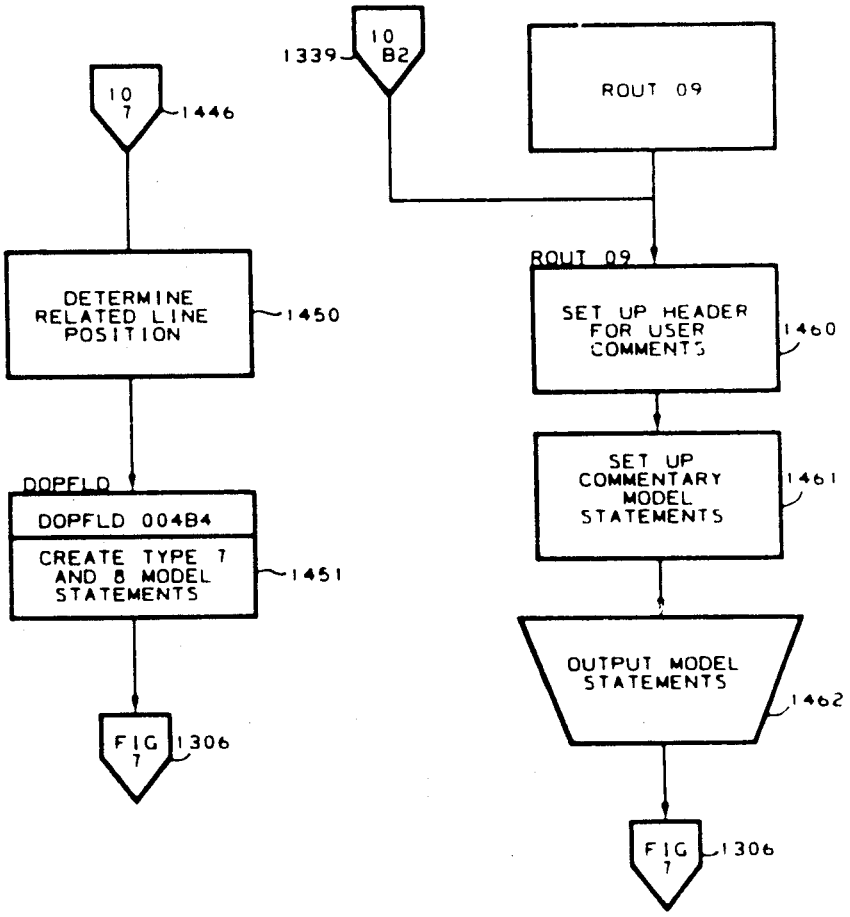
Figure 11A:
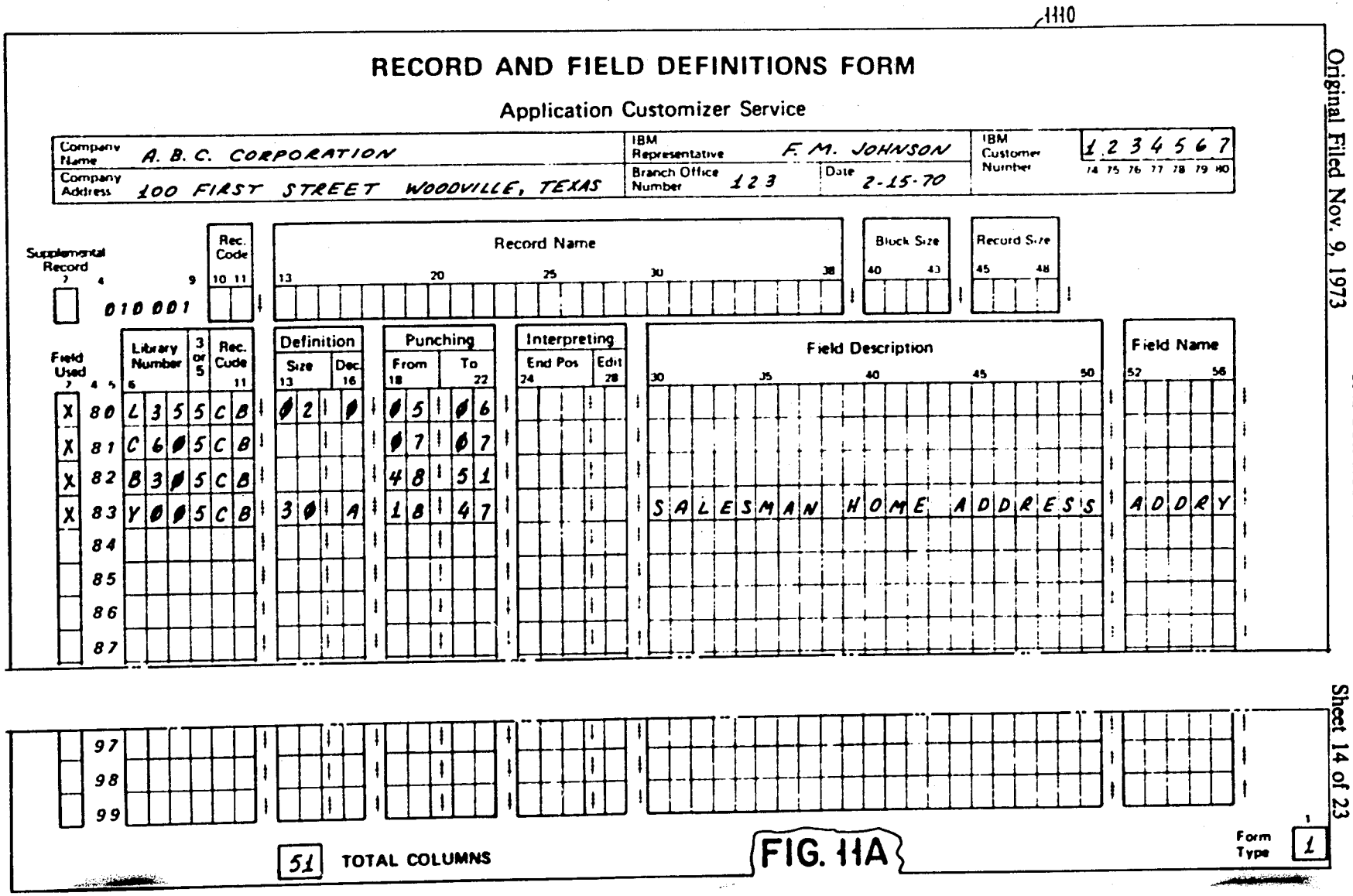
Figure 12B:
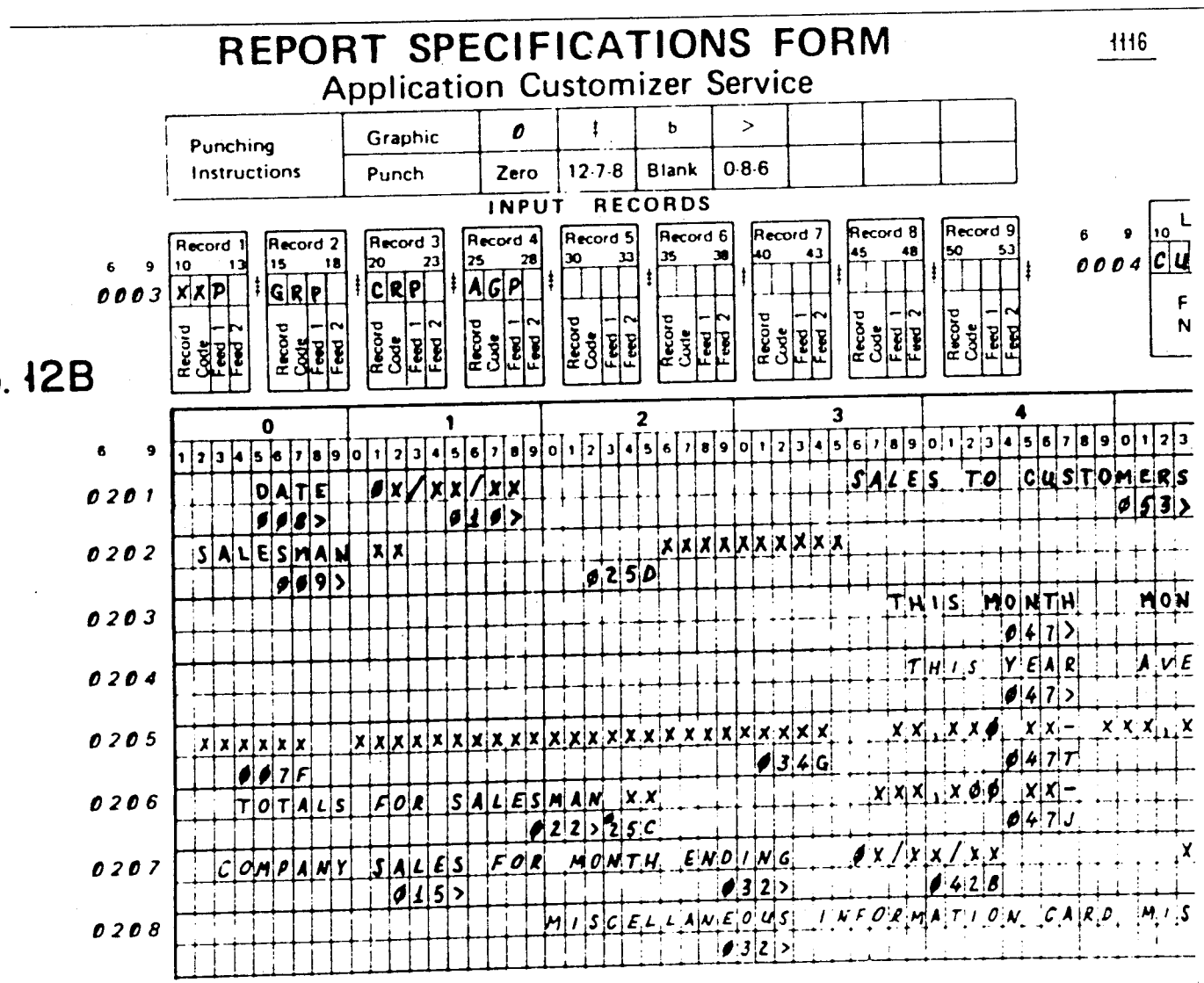
Figures 12, 12C:
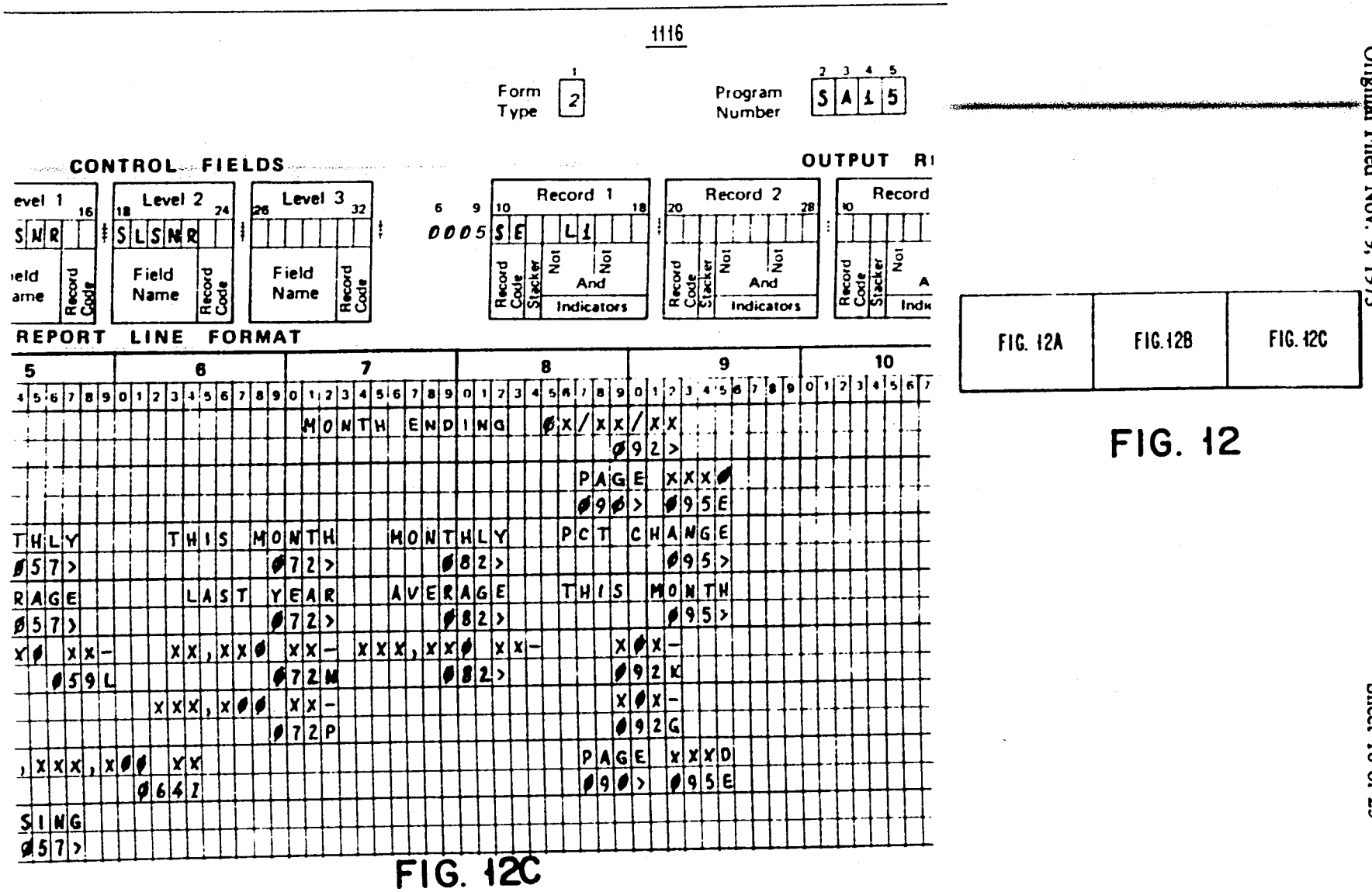
Figure 13:
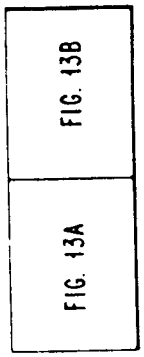
Figure 13B:
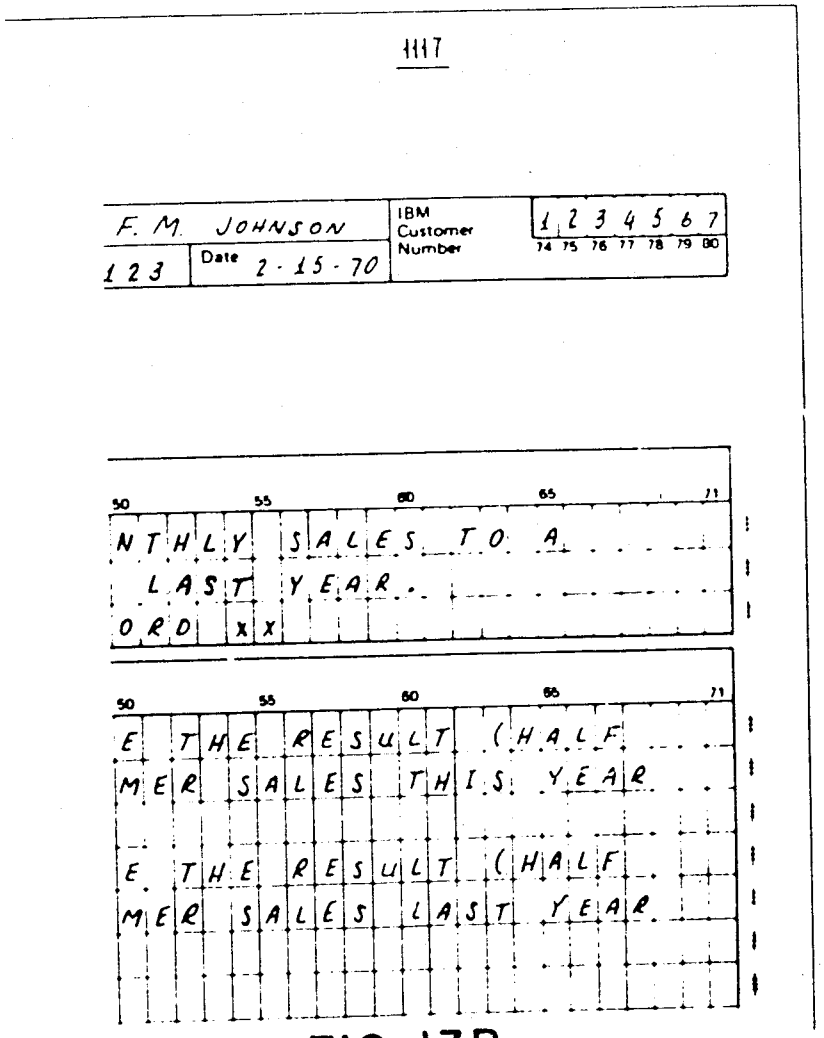

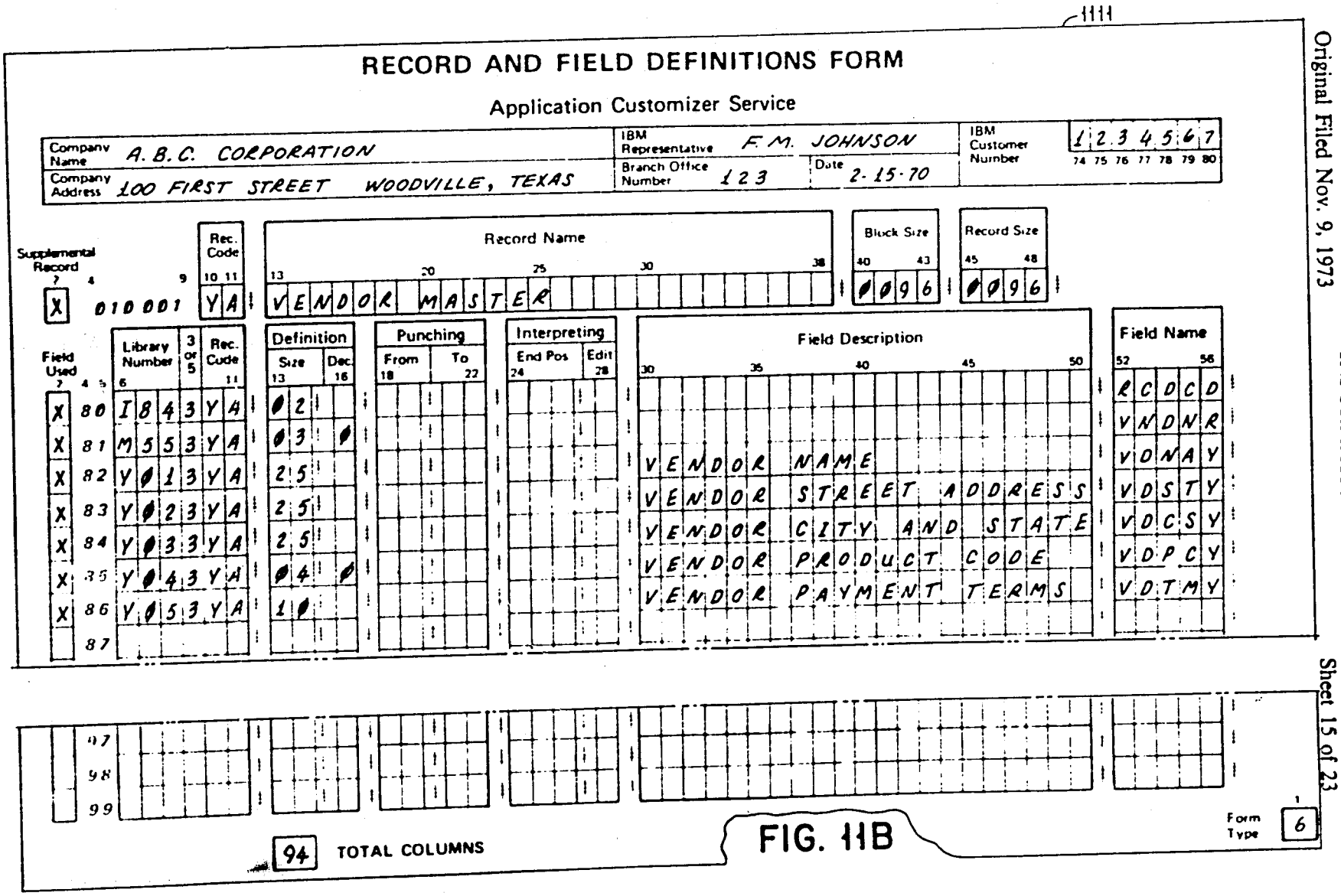
RECORD AND FIELD DEFINITIONS FORM
Application Customizer Service
Company Name A.B.C. CORPORATION
Company Address 100 FIRST STREET WOODVILLE, TEXAS
IBM Representative F.M. JOHNSON
Branch Office Number 123
Date 2-15-70
IBM Customer Number 1234567
Supplemental Record
Field Used
Rec. Code
Record Name
Block Size
Record Size
Library Number
Definition
Size
Dec.
Punching
From
To
Interpreting
End Pos
Edit
Field Description
Field Name
TOTAL COLUMNS
Form Type
FIG. 11B

1115

Date 2-15-70 Branch Office Number 123

Company A.B.C. CORPORATION

| 6 | 9 | 10 | 21 | 24 |
|---|---|---|---|---|
| 0000 | 0000 Card | REPORTSPECS | Page | |

IDENTIFICATION

| 6 | 9 | 10 | 13 | 15 | 35 |
|---|---|---|---|---|---|
| 0001 | Program | SA15 | Report Title | SALESMAN/CUST ANAL | |

LINES

| 5 | 9 | 10 | 14 | 16 |
|---|---|---|---|---|
| 0002 | Total | 466 | Last | 050 |

REPORT FIELD IDENTIFICATION

| 6 | 9 | 10 | 11 | 12 | 13 | 14 | 15 | 16 | 17 | 18 | 19 | 21 | 22 | 23 | 24 | 25 | 26 | 27 | 28 | 29 | 30 |
|---|---|---|---|---|---|---|---|---|---|---|---|---|---|---|---|---|---|---|---|---|---|
| | | Reference Character | | Field Name | | | | | Record Code | | Accumulator | Reference Character | | Field Name | | | | | Record Code | | Accumulator |
| 0010 | A | b | U | D | A | T | E | | | | | B | b | D | A | T | E | 1 | | | |
| 0011 | C | b | S | L | S | N | R | | | | | D | b | S | L | S | N | M | | | |
| 0012 | E | b | P | A | G | E | | | | | | F | b | C | U | S | N | R | | | |
| 0013 | G | b | C | U | S | N | N | | | | | H | b | I | T | N | S | A | G | 1 | |
| 0014 | J | b | A | C | U | M | 1 | | | | | K | b | W | R | K | 2 | 1 | | | |
| 0015 | L | b | W | O | R | K | A | | | | | M | b | W | O | R | K | 2 | | | |
| 0016 | N | b | W | R | K | Ø | 6 | | | | | P | b | W | R | K | 3 | 6 | | | |
| 0017 | O | b | W | R | K | Ø | 2 | | | | | R | b | | | | | | | | |
| 0018 | S | b | | | | | | | | | | T | b | | | | | | | | |
| 0019 | U | b | | | | | | | | | | V | b | | | | | | | | |

Output Indicators

| 6 | 9 | Space Before | Space After | Skip Before | Skip After | And N | And | And N | And | And N | And |
|---|---|---|---|---|---|---|---|---|---|---|---|
| 0101 | | | 2 | Ø4 | | | C | | B | | |
| 0102 | | | 2 | | | | O | | F | | |
| 0103 | | | 1 | | | | C | | B | | |
| 0104 | | | 2 | | | | O | | F | | |
| 0105 | | | 1 | | | | C | | B | | |
| 0106 | | 1 | | | Ø1 | | O | | F | | |
| 0107 | | | | Ø4 | Ø1 | | L | | 1 | | |
| 0108 | | | | | Ø1 | | L | | 2 | | |
| 0109 | | | | | | | L | | R | | |
| | | | | | | | H | | 1 | | |

FIG. 12A

1117

International Business Machines Corporation

REPORT CALCULATIONS FORM

Application Customizer Service

Company Name: A.B.C. CORPORATION
Company Address: 100 FIRST STREET WOODVILLE, TEXAS
IBM Representative
Branch Office Number 0401 SAL5 Program Number 0402 MNAVGY Routine Label

PURPOSE OF CALCULATION

0405 LEVEL 1 ROUTINE TO CALCULATE AVERAGE MO
0406 SALESMAN'S CUSTOMER, BOTH THIS YEAR AND
0407 THE NUMBER OF MONTHS CONSTANT IS IN REC

PROGRAMMING STEPS NECESSARY

0410 DIVIDE (WRK03) BY (MNTHY) AND STOR
0411 ADJUSTED IN MONTHLY AVERAGE CUSTO
0412 (WORKA, DEFINE). BY (MNTHY) AND STOR
0413 DIVIDE (WRK00) IN MONTHLY AVERAGE CUSTO
0414 ADJUSTED
0415 (WORKB, DEFINE).
0416

FIG. 13A

FILE 23 DEFINITION

SOURCE STATEMENT

```
FILE 23    DATA DICTIONARY (SORTED)

                    BLOCK SIZE = 270
                    RECORD SIZE = 54
                    RECORD FORMAT = FIXED
                    FILE SEQUENCE = SEQUENTIAL BY PRIORITY CODE
                                    WITHIN RECORD CODE WITHIN
                                    LINK NUMBER
                    END OF FILE INDICATOR = /*

                    THIS FILE CONTAINS THE USER SELECTED, AND
                    AC GENERATED, RECORDS AND FIELDS WHICH
                    MAKE UP A DATA BASE.

                    THIS FILE IS GENERATED BY PHASE DGP00A FOR
                    USE BY THIS PHASE.

          FILE 23 I/O DESCRIPTION RECORD

FILE 23   DC    H'14'        FILE 23 FILE CODE
          DC    H'10'        FILE 23 OPERATION CODE (READ)
          DC    2H'0'        FILE 23 DISK ADDRESS
          DC    H'270'       FILE 23 I/O AREA LENGTH
          ORG   *+270        FILE 23 I/O AREA

          FILE 23 FORMAT 0 - WORK AREA

FORM 2300 DS    CL54         FILE 23 WORK AREA

          FILE 23 FORMAT 1 - RECORD DEFINITION INFORMATION

          ORG   FORM 2300
IDNT 23   DS    0CL6         I.D. DATA FOR PREVIOUS RECORD STORING
LINK 23   DS    CL3          LINK NUMBER (000)
RECD 23   DS    CL2          RECORD CODE
PRTY 23   DS    CL1          PRIORITY 1 = VERIFIED DATA BASE
                                         2 = DATA RESPONSE SET
          DS    CL48         UNUSED BY THIS PHASE

          FILE 23 FORMAT 2 - FIELD DEFINITION INFORMATION

          ORG   FORM 2300
          DS    CL6
INSQ 23   DS    CL2          INPUT SEQUENCE
FFLD 23   DS    CL3          FROM FIELD
TFLD 23   DS    CL3          TO FIELD
RPGN 23   DS    CL5          RPG LABEL (VERIFIED DATA BASE ONLY)
SIZE 23   DS    CL2          SIZE
DECS 23   DS    CL1          DECIMAL ( BLANK, 0-9, OR A )
IPOS 23   DS    CL3          INTERPRET END PRINT POSITION
ICOD 23   DS    CL1          INTERPRET EDIT CODE
FDES 23   DS    CL21         FIELD DESCRIPTION
APPL 23   DS    CL7          APPLICATIONS USED IN
```

FIG. 14

FILE 11 DEFINITION

SOURCE STATEMENT

```
FILE 11 - DATA LIBRARY

          BLOCK SIZE = 270
          RECORD SIZE = 54
          RECORD FORMAT = FIXED
          FILE SEQUENCE = ALL FORMAT 1 RECORDS AT BEGINNING
                          FORMAT 2 AND 3 RECORDS ARE IN
                          SEQUENCE BY FORMAT TYPE WITHIN
                          LINK NUMBER
          END OF FILE INDICATOR = X'FFFF'

          THIS FILE CONTAINS ALL AC SUPPLIED DATA ABOUT
          FIELDS THE USER MAY SELECT FOR HIS DATA BASE.

          THIS IS AN AC MASTER FILE.

FILE 11 I/O DESCRIPTION RECORD

FILE 11   DC      H'04'    FILE 11   FILE CODE
          DC      H'10'    FILE 11   OPERATION CODE (READ)
          DC      2H'0'    FILE 11   DISK ADDRESS
          DC      H'270'   FILE 11   I/O AREA LENGTH
          ORG     *+270    FILE 11   I/O AREA

          FILE 11 FORMAT 0 - WORK AREA
FORM 1100 DS      CL54     FILE 11   WORK AREA
          FILE 11 FORMAT 1 - APPLICATION IDENTIFICATION
          ORG     FORM 1100
LINK 11   DS      CL4      BLANK LINK NUMBER PLUS Z
SE OF 11  DS      CL6      BLANK SEQUENCE FIELD
APCD 11   DS      0CL2     APPLICATION CODE
APL 111   DS      C           BYTE 1 (0 THRU 6)
APL 211   DS      C           BYTE 2 (1, 2, OR 4)
APNM 11   DS      CL15     APPLICATION NAME
          DS      CL27     UNUSED

          FILE 11 FORMAT 3 - EXTENDED FIELD DEFINITION
          ORG     FORM 1100
          DS      CL4      LINK NUMBER AND Z
          DS      CL5      FIELD NAME
          DS      CL2      SEQUENCE CODE (' B' THRU ' Z')
FDES 11   DS      CL43     FIELD DEFINITION

          FILE 11 FORMAT 2 - FIELD DESCRIPTION

FORM 211  DS      0CL54
          DS      CL4      LINK NO. (THREE DIGITS) PLUS Z
RPGN 11   DS      CL5      FIELD NAME
SEQC 11   DS      CL2      SEQUENCE CODE (MUST BE ' A')
```

FIG. 15

FILE 24 DEFINITION

SOURCE STATEMENT

```
FILE 24   -   VERIFIED DATA BASE

              BLOCK SIZE = 270
              RECORD SIZE = 54
              RECORD FORMAT = FIXED
              FILE SEQUENCE = BY LINK NUMBER

              THIS FILE CONTAINS ALL USER DATA DICTIONARY
              INFORMATION, SUPPLEMENTED WITH FIELD DESCRIPTION
              DATA FROM THE AC DATA LIBRARY.

              END OF FILE INDICATOR = C'/* '

          FILE 24 I/O DESCRIPTION RECORD
FILE 24   DC      H'15'     FILE 24 FILE CODE
          DC      H'09'     FILE 24 OPERATION CODE (PUT)
          DC      2H'0'     FILE 24 DISK ADDRESS
          DC      H'270'    FILE 24 I/O AREA LENGTH
          ORG     *+270     FILE 24 I/O AREA

          FILE 24 FORMAT 0 - WORK AREA

FORM 2400 DS      CL54
FORM 2410 DS      CL54                PRIORITY 2 OR 4 WORK AREA

          FILE 24 FORMAT 1 - RECORD DEFINITION

          ORG     FORM 2400
LINK 24   DS      CL3               LINK NUMBER
RECD 24   DS      CL2               RECORD CODE
PRTY 24   DS      C                 PRIORITY '1'
SQCD 24   DS      CL5       SEQUENCE CODE (BLANK)
RCNM 24   DS      CL26      RECORD NAME
BLSZ 24   DS      CL4       BLOCK SIZE
RCSZ 24   DS      CL4       BLOCK SIZE
          DS      CL2       UNUSED
APPL 24   DS      CL7       APPLICATIONS

          FILE 24 FORMAT 2 - FIELD DEFINITION
          ORG     FORM 2410+54
FORM 224  DS      0CL54
          DS      CL3             LINK NUMBER
          DS      CL2             RECORD CODE
          DS      C               PRIORITY 3
INSQ 24   DS      CL2             INPUT SEQUENCE
FFLD 24   DS      CL3             FROM FIELD
TFLD 24   DS      CL3             TO FIELD
RPGN 24   DS      CL5             RPG LABEL
SIZE 24   DS      CL2             SIZE OF FIELD
DECS 24   DS      C               DECIMAL POSITIONS
IPOS 24   DS      CL3             INTERPRET END PRINT POSITION
ICOD 24   DS      C               INTERPRET EDIT CODE

FDES 24   DS      CL21            FIELD DESCRIPTION
          DS      CL7             APPLICATIONS

          FILE 24 FORMAT 6 - FIELD USAGE

FORM 624  DS      0CL54
          DS      CL3               LINK NUMBER
          DS      C                 'Z'
          DS      CL5               FIELD NAME
RECD 244  DS      CL2               RECORD CODE
          DS      CL26              RECORD NAME
          DS      CL10              UNUSED
          DS      CL7               APPLICATIONS USED
```

FIG. 16